Figure 1:
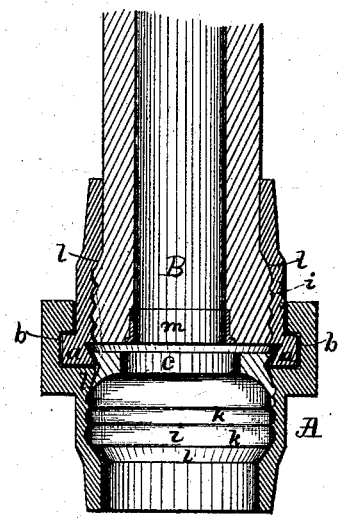
Figure 2:
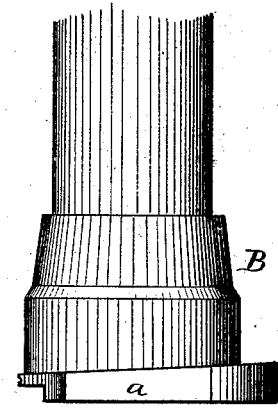
Figure 3:
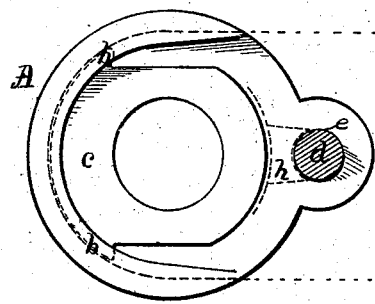
Figure 4:
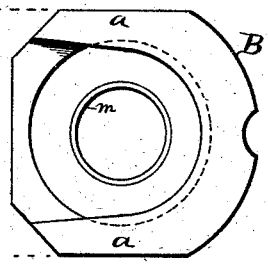

W. A. RIDEOUT.
HOSE-COUPLING.

No. 189,905. Patented April 24, 1877.

Witnesses:
J. H. Spaulding.
Frank J. Baker.

Inventor:
William A. Rideout.

UNITED STATES PATENT OFFICE.

WILLIAM A. RIDEOUT, OF RICHMOND, MAINE.

IMPROVEMENT IN HOSE-COUPLINGS.

Specification forming part of Letters Patent No. 189,905, dated April 24, 1877; application filed March 12, 1877.

*To all whom it may concern:*

Be it known that I, WILLIAM A. RIDEOUT, of Richmond, State of Maine, have invented a Hose-Coupling, of which the following is a specification:

The object of my invention is to provide a hose-coupling that may be easily and rapidly connected or disconnected when in use, that may be attached to the hose in a firm and durable manner, and such a coupling that the greater the pressure upon the inside the tighter become the joints and more firm the connection.

The she or outer part of the coupling is marked A in the several figures of the accompanying drawing, and the he or inner part is marked B. The wedge-flange $a\ a$ of the inner part slides into corresponding slots $b\ b$ of the outer part, and this flange is beveled upon the inside to receive the adjustable packing $c$, maintained in the outer part. This flange is also creased or grooved across the front to receive the packing when pressed in place. When connected the inner part is confined in place by a tapering pin, $d$, passing through a hole, $e$, in the flange of the outer part, and pressing against the flange of the inner part. A rest, $h$, for the end of the pin, may project from the outer part.

I claim as my invention in a hose-coupling, the members of which are connected and disconnected by a lateral movement thereof—

1. The combination of the outer part A with the inner part B, the packing C being arranged to adjust itself to the bevel and grooves of the inner part B, substantially as described.

2. The combination of the inner part B with the wedge-flange $a\ a$ and corresponding parts in the outer part, substantially as described.

3. The combination of the two parts with the tapering pin $d$, substantially as described, and for the purposes specified.

WILLIAM A. RIDEOUT.

Witnesses:
J. W. SPAULDING,
FRANK J. BUKR.